United States Patent
Wakamatsu

(10) Patent No.: US 7,783,929 B2
(45) Date of Patent: Aug. 24, 2010

(54) CONTROLLER FOR A DISK, DISK ENCLOSURE DEVICE, DISK ARRAY APPARATUS, METHOD FOR DETECTING A FAULT OF DISK ENCLOSURE DEVICE, AND SIGNAL-BEARING MEDIUM

(75) Inventor: Yoshinori Wakamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 1347 days.

(21) Appl. No.: 11/207,001

(22) Filed: Aug. 19, 2005

(65) Prior Publication Data
US 2006/0056101 A1    Mar. 16, 2006

(30) Foreign Application Priority Data
Sep. 2, 2004    (JP)    ............... 2004-255567

(51) Int. Cl.
G06F 11/00    (2006.01)
(52) U.S. Cl. ............... 714/42; 714/5; 714/43
(58) Field of Classification Search ............. 714/5, 714/9, 30, 31, 42, 43; 711/152; 710/14
See application file for complete search history.

(56) References Cited

U.S. PATENT DOCUMENTS

| | | | | |
|---|---|---|---|---|
| 4,095,094 A | * | 6/1978 | Struger et al. ............. | 714/31 |
| 4,885,683 A | * | 12/1989 | Coogan ...................... | 714/36 |
| 5,126,889 A | * | 6/1992 | Walden ....................... | 360/53 |
| 5,848,435 A | * | 12/1998 | Brant et al. ................. | 711/152 |
| 5,975,738 A | * | 11/1999 | DeKoning et al. ........... | 700/79 |
| 6,105,092 A | * | 8/2000 | Oeda et al. ................. | 710/104 |
| 6,366,965 B1 | * | 4/2002 | Binford et al. ............... | 710/8 |
| 6,446,199 B1 | * | 9/2002 | Howe et al. .................. | 713/1 |
| 6,578,158 B1 | * | 6/2003 | Deitz et al. ................... | 714/11 |
| 6,809,505 B2 | * | 10/2004 | Peeke et al. .................. | 324/66 |
| 6,959,399 B2 | * | 10/2005 | King et al. .................... | 714/6 |
| 7,146,540 B2 | * | 12/2006 | Kakihara ...................... | 714/31 |
| 7,437,604 B2 | * | 10/2008 | Davies et al. ................. | 714/9 |
| 7,490,264 B2 | * | 2/2009 | Fairhurst et al. .............. | 714/9 |
| 2003/0172317 A1 | * | 9/2003 | Tsunoda et al. ............... | 714/7 |
| 2005/0223266 A1 | * | 10/2005 | Iwamitsu et al. .............. | 714/5 |

FOREIGN PATENT DOCUMENTS

| | | |
|---|---|---|
| JP | 64-19456 | 1/1989 |
| JP | 6-276109 | 9/1994 |
| JP | 11-249823 | 9/1999 |
| JP | 2001-306262 | 11/2001 |

OTHER PUBLICATIONS

Japanese office action dated Jul. 15, 2008 with partial English translation.

* cited by examiner

Primary Examiner—Joshua A Lohn
(74) Attorney, Agent, or Firm—McGinn IP Law Group PLLC

(57) ABSTRACT

A method and structure for a controller for a memory unit includes a switch that provides a first identification code for the memory unit and a comparator that compares the first identification code with at least a second identification code for the memory unit.

13 Claims, 4 Drawing Sheets

CONTROLLER FOR A DISK, DISK ENCLOSURE DEVICE, DISK ARRAY APPARATUS, METHOD FOR DETECTING A FAULT OF DISK ENCLOSURE DEVICE, AND SIGNAL-BEARING MEDIUM

FIELD OF THE INVENTION

The present invention relates to a disk enclosure device for a disk array configured to control a disk with use of two controllers configured with redundancy and to a media control program employed for the same.

BACKGROUND OF THE INVENTION

In a conventional method of controlling disk drives, as described in Japanese Patent Laid-Open No. 64-019456, each magnetic disk drive is provided with an identification (ID) code setting switch. This ID code setting switch comprises, for example, a DIP (dual inline package) switch that can set a value in bits as a binary code. A central processing unit (CPU) of the disk device controls the magnetic disk drive according to the ID code set with the ID code setting switch.

In a conventional method, there is also a disk enclosure device for a disk array configured to control a disk with use of two controllers configured with redundancy. FIG. 1 shows a block diagram of such a disk enclosure device 10a. Hereunder, the disk enclosure device will be described with reference to FIG. 1.

The conventional disk enclosure device 10a is configured to control disk array 3 (a plurality of disk are plugged into the backboard of a disk array apparatus 3) with use of two adapter cards 1a, 2a configured with redundancy. Adapter card 1a includes an ID code setting switch 4, a microprocessor unit (MPU) 5a, and a single drive transistor or a plurality of drive transistors for a bus (hereafter, named as transistor 6). Similarly, adapter card 2a includes an ID code setting switch 14, MPU 15a, and a single drive transistor or a plurality of drive transistors for a bus (hereafter, named as transistor 16). The disk array 3 includes a plurality of hard disk drives (HDDs) 70 . . . 84, plugged into the backboard. The ID code of the disk enclosure device 10a is set with both of the ID code setting switches 4, 14.

However, the conventional disk enclosure device 10a has been confronted with the following problems.

First the output of the ID setting signal 53, 63 cannot be stopped even when the setting is wrong in either of the ID code setting switches 4, 14. For example, in case that "1" is set in the output of transistor 6 of adapter card 1a and "0" is set in the output of the transistor 16 of adapter card 2a, "0" overwrites "1", so that "0" comes to be set as the ID code of HDDs 70 . . . 84.

The second problem is that the output of the ID setting signal 53, 63 cannot be stopped even when a fault occurs in a part of the disk enclosure device 10a. For example, in case that "0" is output from transistor 6 due to a fault in a part of the disk enclosure device 10a, while the output of transistor 6 of adapter card 1a is set so as to output "1", "0" comes to be set as the ID code of HDDs 70 . . . 84, even when "1" is set in the output of the transistor 16 of adapter card 2a.

Therefore, a need exists to be able to detect errors in ID codes and ID code circuit components in disk enclosure devices configured for redundancy.

SUMMARY OF THE INVENTION

In view of the foregoing and other exemplary problems, drawbacks, and disadvantages of the conventional techniques, it is an exemplary feature of the present invention to provide a method and structure that can detect faults such as a wrong setting of each ID code setting switch, or the like, for a disk enclosure device.

The present invention provides a controller for a memory unit. In accordance with the present invention, the controller comprises a switch providing a first identification code for the memory unit and a comparator comparing the first identification code with at least a second identification code for the memory unit.

The controller may comprise a first controller within a disk enclosure device. The disk enclosure device may further comprise the memory unit and a second controller, wherein the comparator receives the second identification code from the second controller.

The second controller may comprise a second switch providing the second identification code for the memory unit and a second comparator that sends the second identification code to the comparator.

The controller may further comprise a drive transistor that outputs a signal received from the comparator to transmit to the disk memory and a bus switch connecting or disconnecting the signal received from the comparator to the memory unit.

The bus switch may disconnect the signal and the comparator may further check an operation of the drive transistor.

The comparator may check an operation of the bus switch.

The present invention also provides a controller for a memory unit. In accordance with the present invention, the controller inputs an identification code to the memory unit The controller comprises means for providing a first identification code for the memory unit and means for comparing the first identification code with at least a second identification code for the memory unit.

The present invention also provides a disk enclosure device. The disk enclosure device comprises a memory unit, a first switch providing a first identification code for the memory unit, and a first comparator comparing the first identification code with at least a second identification code for the memory unit.

The disk enclosure device may further comprise a first controller comprising the first switch and the first comparator, and a second controller, wherein the first comparator receives the second identification code from the second controller.

The second controller may comprise a second switch providing the second identification code for the memory unit and a second comparator sending the second identification code to the first comparator.

The first controller may comprise a first drive transistor outputting a signal received from the first comparator to be sent to the memory unit and a bus switch connecting or disconnecting the signal received from the first comparator to the memory unit.

The bus switch may disconnect and the first comparator may check an operation of the first drive transistor.

The disk enclosure device may further comprise a second bus switch connecting or disconnecting the signal received from the second comparator to the memory unit, wherein the second bus switch may disconnect and the first comparator may check an operation of the first bus switch.

The present invention also provides a disk array apparatus. In accordance with the present invention the disk array apparatus comprises a memory unit, a first switch providing a first identification code for the memory unit, and a first comparator comparing the first identification code with at least a second identification code for the memory unit.

The second controller may comprise the second comparator, a second transistor outputting a signal receiving from the second comparator to the memory unit, a second bus switch connecting or disconnecting a signal line, and the second bus switch connecting the second transistor to the disk, wherein the first comparator makes the second bus switch to disconnect the signal line, and checks an output signal of the first bus switch.

The present invention also provides a method for detecting a fault of a disk array apparatus. In accordance with the present invention, the method comprises receiving a first identification code for a memory unit in the disk array apparatus, receiving a second identification code for the disk memory unit, and comparing the first identification code with the second identification code.

The disk array apparatus may comprise at least one controller. The method may comprise checking an operation of a drive transistor of the controller, the drive transistor used to send a signal output from the controller to the memory unit.

The method may further comprise disconnecting a signal line between the drive transistor and the memory unit, and checking an operation of the drive transistor.

In the method, the disk array apparatus may comprise a second controller. The method may further comprise disconnecting a signal line between the controller and the second controller and checking an operation of the bus switch.

The present invention also provides a signal-bearing medium embodying a program of machine-readable instructions executable by a digital processing apparatus. In the present invention, the program causing a disk enclosure device having a plurality of controllers, each controller inputting an identification code to a memory unit, to perform a method of detecting faults of the disk array apparatus. In the present invention, the method comprises receiving a first identification code receiving a second identification code and comparing the first identification code with the second identification code.

The disk enclosure device is configured to control a disk array with use of two controllers configured with redundancy and each of the two controllers is provided with an ID code setting switch and an MPU. The MPU of each controller has a function for inputting an ID code set with the ID code setting switch provided in one of the two controllers, as well as an ID code received from The MPU in the other controller to determine the setting of either of the ID code setting switches to be wrong in case that the two input ID codes are not identical.

In the above case, the MPU provided in one of the two controllers functions as follows. At first, the MPU inputs an ID code set with the ID code setting switch provided in the same controller. The MPU then inputs an ID code received from the MPU provided in the other controller. And, in case that those two input ID codes are not identical, the MPU determines the setting of either of the ID code setting switches to be wrong. Wrong setting of each ID code setting switch is detected in such way.

The disk enclosure device is provided with the following elements that are not provided in the disk enclosure device above. Concretely, each of the two controllers includes a transistor for outputting a signal received from the MPU to the disk array through a signal line and a bus switch for connecting or disconnecting the signal line between the transistor and the disk array according to a control signal received from the MPU. The MPU has a function for inputting a signal output from the transistor while the signal line is disconnected by the bus switch to detect a fault of the transistor in case that the above two input ID codes are identical. In case that two ID codes are identical, the MPU disconnects the signal line with use of the bus switch. Then, the MPU suppresses transfer of the signal output from the transistor to the disk array, so that the disk array is not affected by any signal output from the MPU to the transistor. In that connection, the MPU inputs a signal output from the transistor to detect a fault of the transistor. For example, the MPU compares a signal output to the transistor with a signal returned from the transistor to determine whether or not the transistor is normal in case that the two signals are identical. In case that the two signals are not identical, the MPU determines the transistor to be abnormal.

The disk enclosure device is provided with the following elements that are not provided in the disk enclosure device. Concretely, the MPU provided in one of the two controllers includes a function for detecting a fault of the bus switch according to a signal output from the bus switch while the signal line is connected by the bus switch.

The MPU connects the signal line with use of the bus switch and inputs a signal output from the bus switch to detect a fault of the bus switch. For example, the MPU outputs an ENABLE signal to the bus switch and determines whether or not the signal returned from the bus switch is proper. In case that the signal is proper, the MPU determines the bus switch to be normal. In case not, the MPU determines the bus switch to be abnormal.

The control program employed for each of the above disk enclosure devices of the present invention is used to enable each MPU in the disk enclosure device to execute the above functions.

The present invention can also be realized as follows.

In the present invention, because two controllers configured with redundancy are used to check each ID setting signal, it is possible to detect wrong setting of each ID code setting switch. In case that wrong setting is detected, the bus switch is turned off to isolate the disk array from such wrong ID code setting.

The present invention uses a bus switch to check each ID setting signal in each controller, so that transistor faults are detected. In case that a transistor fault is detected, the bus switch is turned off to prevent the disk array from the effect of a wrong ID code setting.

Furthermore, in the present invention, the bus switch in each controller is turned OFF/ON to check a returned value, so that bus switch faults are detected. In case that a bus switch fault is detected, the bus switch is turned off to prevent the disk array from the effect of a wrong ID code setting.

In other words, the disk enclosure device of the present invention includes bus switches to enable detection of wrong ID code setting and part faults. In addition, the controlling method of the present invention uses two controllers provided with a bus switch and configured with redundancy respectively and the controllers communicate with each other to detect wrong ID code setting and part faults.

As described above, the present invention has the following effects.

The first effect is that the ID code setting signal is checked in two controllers configured with redundancy, so that each ID code setting switch can be checked for a wrong setting.

The second effect is that each controller provided in a disk disclosure checks each ID code setting signal with use of the bus switch, thereby transistor faults are detected.

The third effect is that each returned value is checked by turning OFF/ON the bus switch of each controller, thereby bus switch faults are detected.

The fourth effect is that each controller is provided with a bus switch, thereby the output of the ID code setting signal can be stopped in case that a wrong setting in an ID code setting switch and part faults are detected.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

DETAILED DESCRIPTION OF THE EXEMPLARY EMBODIMENTS

Hereunder, the exemplary embodiments of the present invention will be described with reference to the accompanying drawings. It is noted that the "controller," "comparator" or "digital processing apparatus," and "memory unit" in the scope of the claims are more concretely referred to as an "adapter card" and a "microprocessor" or "MPU," and "disk array 3" respectively in the following discussion.

Figure 1:
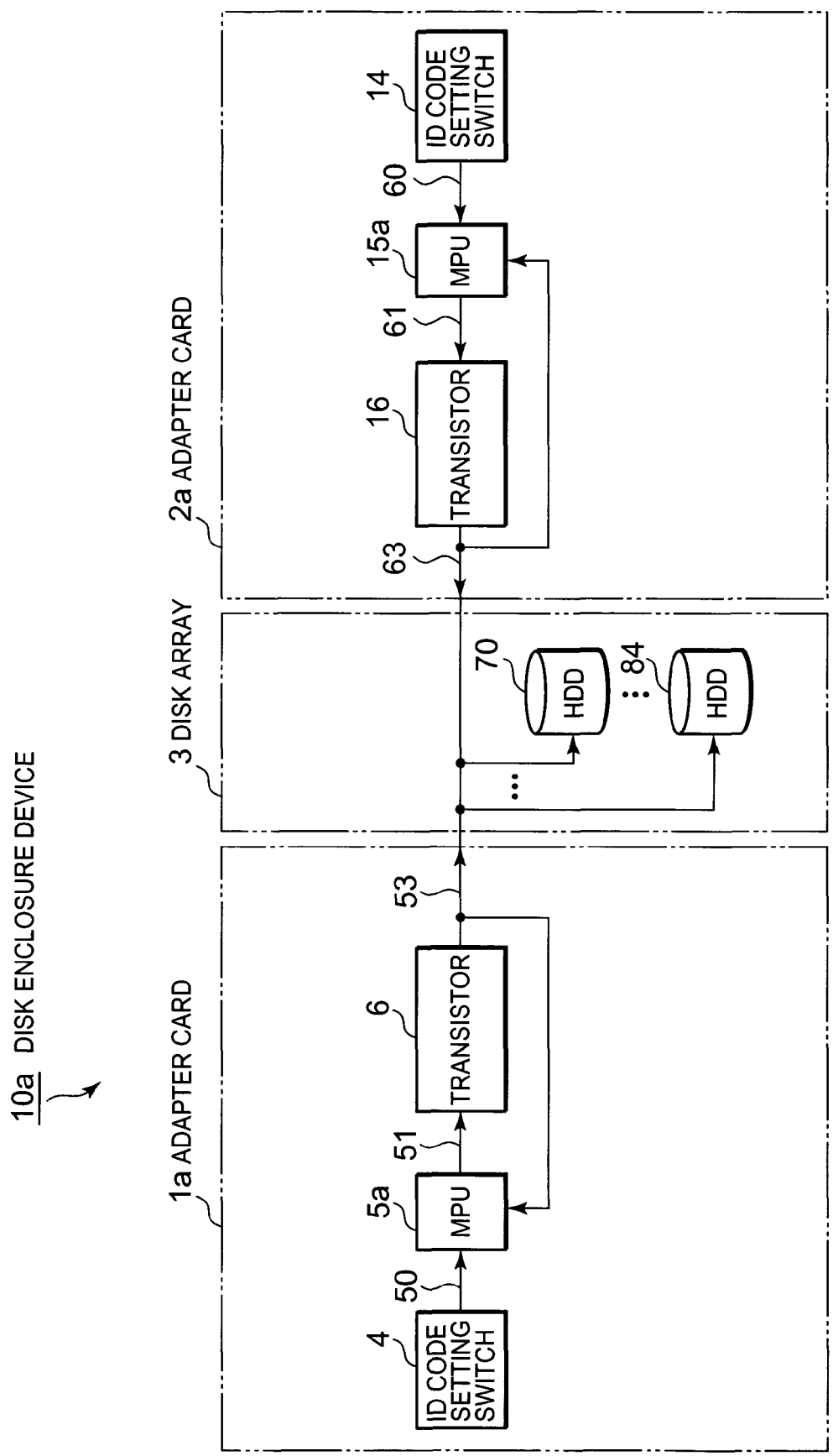
FIG. 1 is a block diagram of a conventional disk enclosure device.
Figure 2:
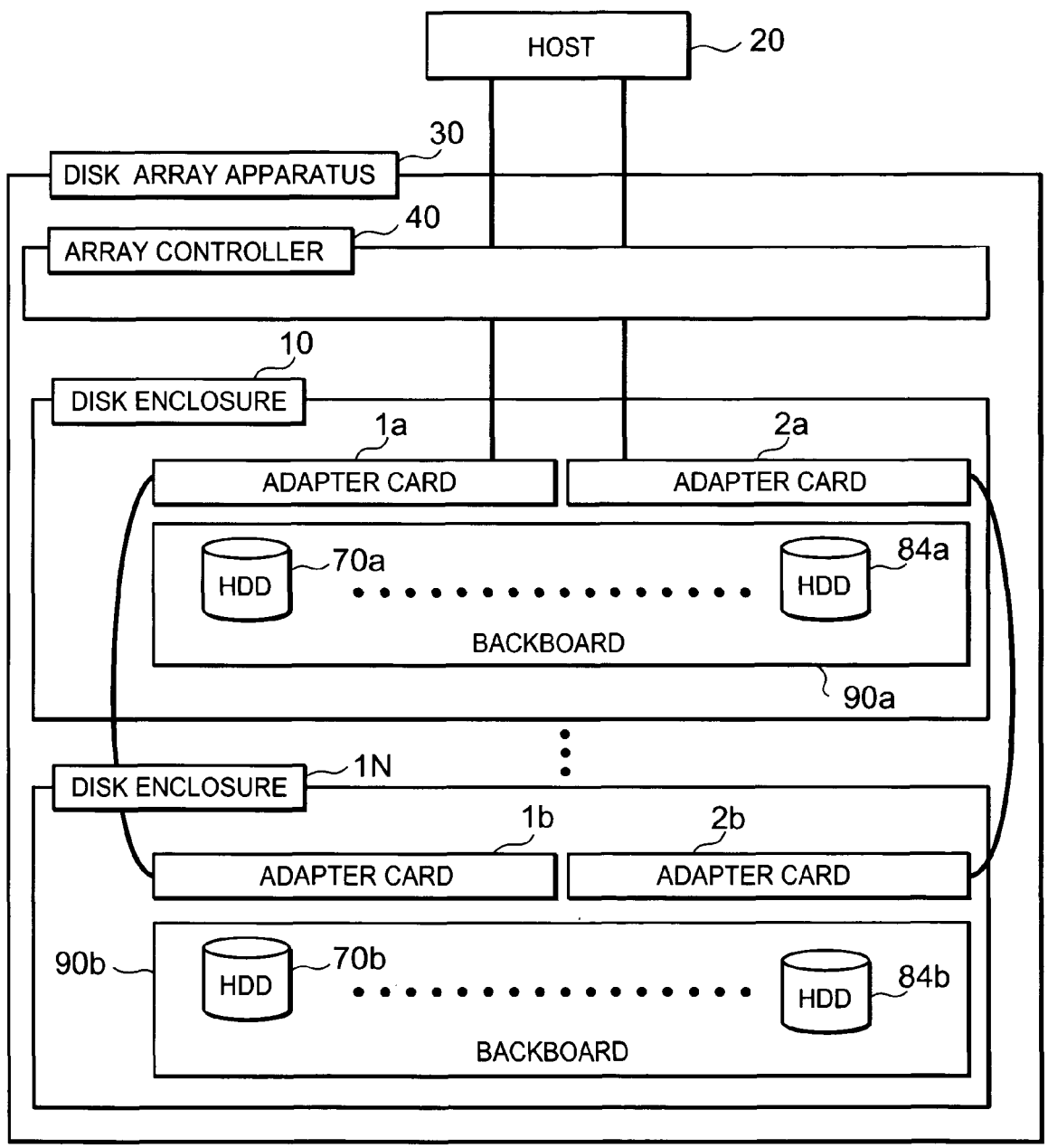
FIG. 2 is an exemplary block diagram of a disk array apparatus and a host that illustrates the present invention.

FIG. 2 is a block diagram of a disk array apparatus 30 and a host 20. The disk array apparatus 30 includes array controller 40 and a plurality of disk enclosures 10 to 1N. Each of disk enclosures 10 . . . 1N includes a backboard 90a . . . 90b. Adapter card 1a and adapter card 2a, and HDDs 70a . . . 84a are plugged into the backboard 90a. Similarly two adapter cards 1b, 2b, and HDDs 70b . . . 84b are plugged into the backboard 90b.

Array controller 40 controls the overall operation of disk array apparatus 30. The host is connected to disk array apparatus 30.

Figure 3:
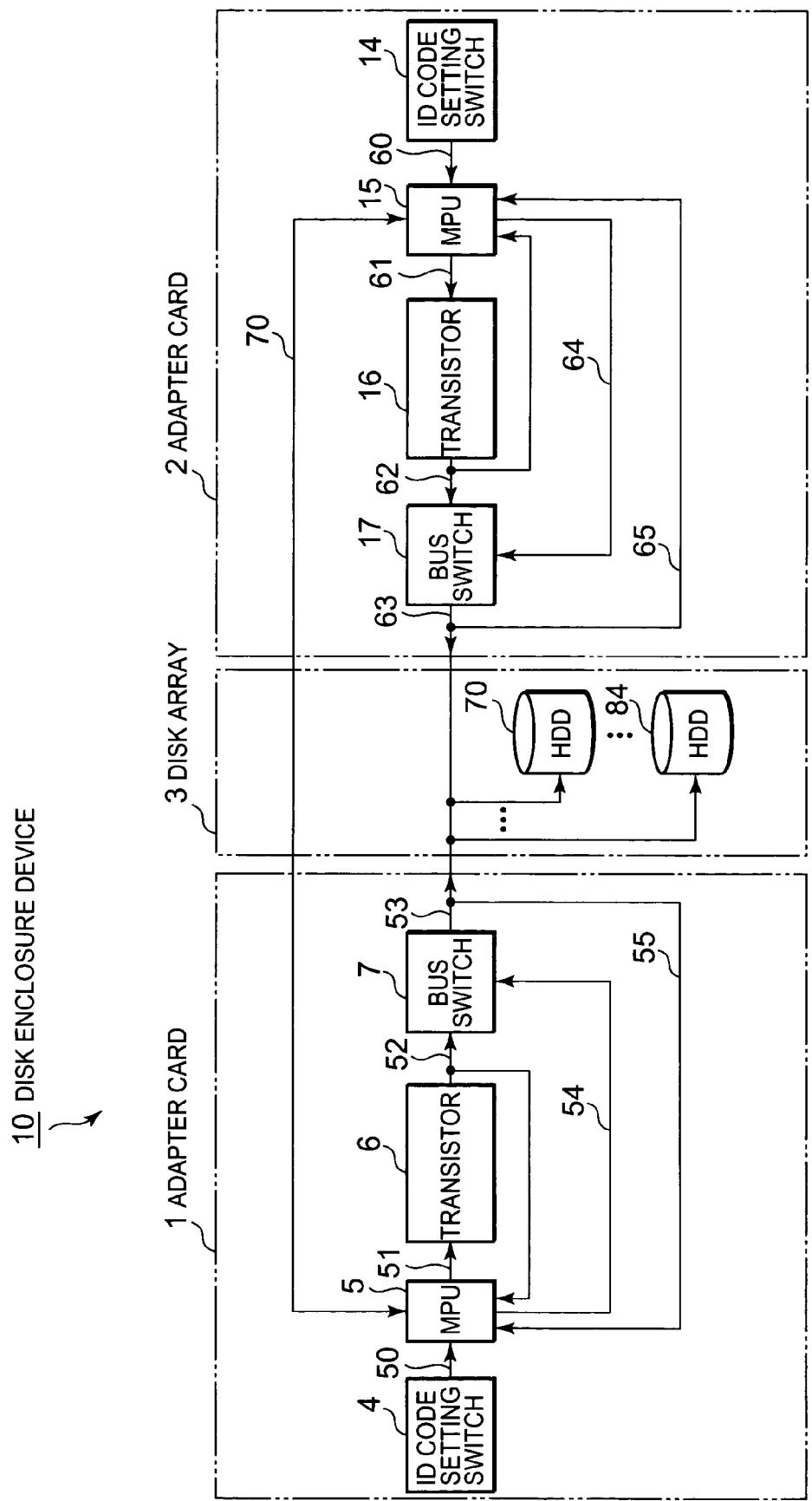
FIG. 3 is a block diagram of a disk enclosure device in an exemplary embodiment according to the present invention.

FIG. 3 is a block diagram of a disk enclosure device 10 in an exemplary embodiment of the present invention.

The disk enclosure device 10 in this exemplary embodiment is configured to control a disk array 3 with use of two adapter cards 1, 2 configured with redundancy. Adapter card 1 includes an ID code setting switch 4, an MPU 5, a transistor 6 for outputting a signal 53 output from MPU 5 to the disk array 3 through a signal line 52, and a bus switch 7 for connecting or disconnecting the signal line 52 between transistor 6 and the disk array 3, according to a control signal 54 received from MPU 5. Actually, transistor 6 might be one transistor of a plurality of driver transistors for outputs of MPU 5, and bus switch 7 might be one of a plurality of switches on the bus. MPU 5 executes a program of machine-readable instructions embodied in a signal-bearing medium to be discussed shortly.

Similarly, adapter card 2 includes an ID code setting switch 14, an MPU 15, a transistor 16, and a bus switch 17. In other words, adapter card 1 includes an ID code setting switch 4, an MPU 5 that receives an ID setting signal 50 from the ID code setting switch 4, a transistor 6 for driving the ID signal 53 to each of HDDs 70 . . . 84 according to a signal 51 output from MPU 5, and a bus switch 7 for turning OFF/ON the ID signal 52 received from transistor 6. Adapter card 2 also includes similar circuits. Each of HDDs 70 . . . 84 receives the ID signal 53, 63 and stores the ID code.

MPU 5 has the following functions. MPU 15 has corresponding functions.

(1) Receiving an ID code set with the ID code setting switch 4 and an ID code received from MPU 15 to determine whether the setting in either of the ID code setting switches 4, 14 is wrong, as would be the case when those two input ID codes are not identical, as checked by MPU 5.

(2) Detecting a fault of transistor 6, according to an signal 52 received from the output side of transistor 6 while the signal line 53 is disconnected by the bus switch 7, as a second step in the case that the two ID codes inputted from the ID code setting switch 4 and MPU 15 are identical.

(3) Detecting a fault of the bus switch 7, according to an signal 55 received from the output side of bus switch 7, while the signal line 52 is disconnected by the bus switch 7, after the function in (2) has been executed.

As described above, the disk enclosure device 10 can detect a wrong setting in either of the ID code setting switches 4, 14, as well as faults of the transistors 6, 16 and of the bus switches 7, 17. Hereinafter, the functions of the disk enclosure device 10 will be described in detail in more general terms.

In the present invention, the disk enclosure device comprises a memory unit, a first controller and a second controller. The first controller comprises a first switch providing a first identification code for the memory unit, and a first comparator, the first comparator receiving the second identification code from the second controller. The first controller compares the first identification code with at least a second identification code for the memory unit. The second controller comprises a second switch providing the second identification code for the memory unit, and a second comparator sending the second identification code to the first comparator.

For example, the disk enclosure 10 of FIG. 3, includes two adapter cards 1, 2 configured with redundancy. Adapter card 1, 2 has an ID code setting switch 4, 14 used to set an ID code. It should be apparent to one of ordinary skill in the art, after taking the discussion above as a whole, that any number of memory elements can be used, and that additional controllers could be added for additional redundancy.

When the disk enclosure device 10 initially starts, MPU 5, 15 operates as follows. At first, MPU 5, 15 inputs the ID setting signal 50, 60 set with the ID code setting switch 4, 14 and writes the inputted signal into a register. After that, MPU 5, 15 communicates with the other MPU 5, 15 using a signal 70 to compare the mutual ID setting signals 50, 60 with each other. If those set values are not identical, MPU 5, 15 determines the ID code to be set wrongly in at least one of the ID code setting switches 4, 14, and can stop the starting sequence of the disk enclosure device 10, or perhaps provide an indication of the disagreement.

In the case that those set values are identical, in the present invention, the first controller comprises a first drive transistor outputting a signal received from the first comparator to be sent to the memory unit, and a bus switch connecting or disconnecting the signal received from the first comparator to the memory unit. The bus switch disconnects the signal line and the first comparator may check an operation of the first drive transistor.

More specifically speaking, for example in the embodiment shown in FIG. 3, in the case that the set values of adapter cards 1, 2 are identical, MPU 5, 15 then changes output value 51, 61 after the bus switch 7, 17 that can turn OFF/ON each signal is turned OFF, to check the output value 52, 62 of transistor 6, 16 in order to detect a fault in transistor 6, 16.

After that, in the present invention, the second controller comprises a second bus switch connecting or disconnecting the signal received from the second comparator to the memory unit. The second bus switch disconnects its signal line and the first comparator checks an operation of the first bus switch.

Specifically speaking, for the example shown in FIG. 3, while the bus switch 7 is turned OFF, MPU 15 turns ON the bus switch 17 to check the returned value 65, thereby detecting a fault in the bus switch 17. Similarly, while the bus switch 17 is turned OFF, MPU 5 turns on the bus switch 7 to check the returned value 55 to detect a fault in the bus switch 7.

Finally, in the case that no wrong setting is detected in any of the ID code setting switches 4, 14, no fault is detected in any of the transistors 6, 16, as well as in any of the bus switches 7, 17, MPUs 5, 15 continue starting of the disk disclosure 10.

Figure 4:
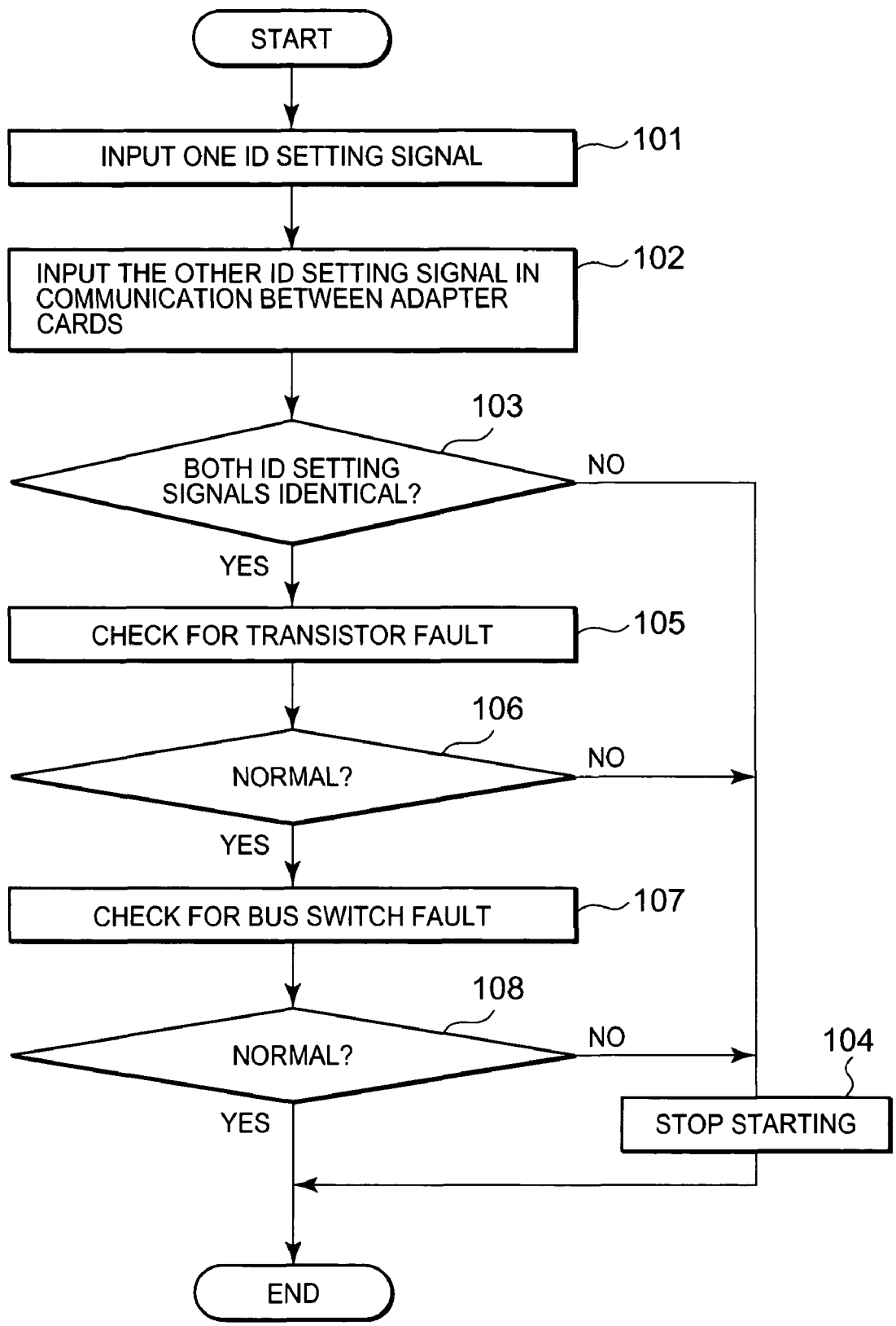
FIG. 4 is a flowchart of the operation of the disk enclosure device shown in FIG. 3.

FIG. 4 is a flowchart of the start up operation of the disk enclosure shown in FIG. 3. Hereinafter, the operation of the disk disclosure 10 will be described with reference to FIGS. 3 and 4.

The ID code of the disk enclosure is set beforehand by the ID code setting switches 4, 14 in any manner, such as DIP switches, that might be used on a computer adapter card. In an exemplary embodiment, this ID code sets the upper three bits of the ID code of HDDs 70 . . . 84. In the case that a plurality of disk enclosure devices 10 is connected for use, a unique ID code is set for each of the disk enclosure devices 10.

Next, a description will be made for the operation of MPU 5, 15 during the start up sequence of the disk enclosure device 10. At first, each MPU 5, 15 receives, respectively, an ID code setting signal 50, 60 set with its ID code setting switch 4, 14 and writes the input signal 50, 60 in a register (step 101). After that, MPU 5, 15 enables the communication between adapter cards 1, 2 so that the ID signals 50 and 60 are compared with each other (step 102). If the signals 50, 60 are not identical here, MPU 5, 15 determines that a wrong setting occurs in one of the ID code setting switches 4, 14 and stops the start up sequence of the disk enclosure device 10 (steps 103 and 104).

On the other hand, in the case that the set values of adapter cards 1, 2 are identical, MPU 5, 15 checks the output values of the transistors 6 and 16 to detect faulty operation in any of the transistors by changing those output values while the bus switches 7, 17 are turned OFF (step 105). In case that a fault is detected in that check, MPU 5, 15 stops the start up sequence of the disk enclosure device 10. In case no transistor fault is detected, control goes to a step for detecting a fault in any of the bus switches 7, 17 (step 106).

After that, MPU 15 turns ON the bus switch 17 with an ENABLE signal 64 while the bus switch 7 is turned OFF to check the returned value 65 therefrom to detect a fault in the bus switch 17 (step 107). Similarly, MPU 5 turns ON bus switch with 7 an ENABLE signal 54 while the bus switch 17 is turned OFF, to check the returned value 55 therefrom to detect a fault in the bus switch 7 (step 107).

Finally, in case that no wrong setting is detected in any of the ID code setting switches 4, 14, and no fault is defected in any of the transistors 6 and 16, as well as in the bus switches 7, 17, MPU 5, 15 continues any other startup sequence of the disk enclosure device 10 (step 108).

While this invention has been described with reference to illustrative embodiments, this description is not intended as limiting. Various modifications of the illustrative embodiments, as well as the other embodiments of the invention will be apparent to persons skilled in the art upon taking to this description as a whole. It is, therefore, contemplated that the appended claims will cover any such modifications or embodiments as fall within the true scope of the invention.

Further, the inventor's intent is to encompass equivalents of all elements of the claimed invention, even if the claims are amended during prosecution.

What is claimed is:

1. A controller for a memory unit, comprising:
   a switch providing a first identification code for said memory unit;
   a first comparator comparing said first identification code with at least a second identification code for said memory unit; and
   a first controller within a disk enclosure device, said disk enclosure device comprising:
      said memory unit; and
      a second controller, said second controller comprising:
         a second switch providing said second identification code for said memory unit; and
         a second comparator that sends said second identification code to said first comparator,
   wherein said first comparator receives said second identification code from said second controller.

2. The controller according to claim 1, further comprising:
   a drive transistor that outputs a signal received from said first comparator to transmit to said memory unit; and
   a bus switch connecting or disconnecting said signal received from said first comparator to said memory unit.

3. The controller according to claim 2, wherein said bus switch disconnects said signal and said first comparator further checks an operation of said drive transistor.

4. The controller according to claim 2, wherein said first comparator further checks an operation of said bus switch.

5. The controller according to claim 1, wherein said switch sets said second identification code uniquely from said first identification code.

6. The controller according to claim 1, wherein said switch detects an identification error unique to said disk enclosure device.

7. The controller according to claim 1, wherein said first comparator detects an identification error unique to said disk enclosure device, and
   wherein said first comparator compares said first identification code which is unique to said disk enclosure device with said second identification code.

8. A controller for a memory unit, comprising:
   means for providing a first identification code for said memory unit; and
   means for comparing said first identification code with at least a second identification code for said memory unit;
   first control means set within a disk enclosure device, said disk enclosure device comprising:
      said memory unit; and
      second control means, said second control means comprising:
         means for providing said second identification code for said memory unit; and
         means for sending said second identification code to said means for comparing said first identification code,
   wherein said means for comparing said first identification code receives said second identification code from said second control means.

9. A disk enclosure device, comprising:
   a memory unit;
   a first switch providing a first identification code for said memory unit;

a first comparator comparing said first identification code with at least a second identification code for said memory unit;
a first controller comprising said first switch and said first comparator; and
a second controller, said second controller comprising:
  a second switch providing said second identification code for said memory unit; and
  a second comparator sending said second identification code to said first comparator,
wherein said first comparator receives said second identification code from said second controller.

10. The disk enclosure device according to claim 9, wherein said first controller comprises:
  a first drive transistor outputting a signal received from said first comparator to be sent to said memory unit; and
  a bus switch connecting or disconnecting said signal received from said first comparator to said memory unit.

11. The disk enclosure device according to claim 10, wherein said bus switch disconnects said signal and said first comparator checks an operation of said first drive transistor.

12. The disk enclosure device according to claim 11, further comprising a second bus switch connecting or disconnecting said signal received from said second comparator to said memory unit,
wherein said second bus switch disconnects said signal and said first comparator checks an operation of said first bus switch.

13. A disk array apparatus, comprising:
a memory unit;
a first switch providing a first identification code for said memory unit;
a first comparator comparing said first identification code with at least a second identification code for said memory unit; and
a controller, comprising:
  a second comparator;
  a transistor outputting a signal receiving from said second comparator to said memory unit; and
  a bus switch connecting or disconnecting a signal line, said bus switch connecting said transistor to said memory unit, and
wherein said first comparator makes said bus switch disconnect said signal line and checks an output signal of another bus switch.

* * * * *